United States Patent [19]

Mazaki

[11] Patent Number: 4,639,161
[45] Date of Patent: Jan. 27, 1987

[54] SHELVING DEVICE

[75] Inventor: Yoshiyuki Mazaki, Kokubunji, Japan

[73] Assignee: Kabushiki Kaisha Murakoshi Seiko, Tokyo, Japan

[21] Appl. No.: 793,853

[22] Filed: Nov. 1, 1985

[51] Int. Cl.⁴ .................................................. F16B 13/10
[52] U.S. Cl. ...................................... 403/245; 403/231; 403/407.1
[58] Field of Search ...................... 248/235, 250, 224.1, 248/224.3, 220.2; 108/152; 403/407.1, 231, 405.1, 403, 245

[56] References Cited

U.S. PATENT DOCUMENTS

| | | | |
|---|---|---|---|
| 3,094,892 | 6/1963 | Topf | 248/220.2 X |
| 4,060,949 | 12/1977 | Busse | 403/407.1 X |
| 4,127,353 | 11/1978 | Busse | 403/245 |
| 4,353,663 | 10/1982 | Glickman | 403/407 X |
| 4,357,119 | 11/1982 | Pollitt | 403/231 |
| 4,545,698 | 10/1985 | Koch | 403/407.1 X |

FOREIGN PATENT DOCUMENTS 2919769 11/1980 Fed. Rep. of Germany ...... 403/231
1314618 12/1962 France ................................ 248/220.2

Primary Examiner—Ramon S. Britts
Assistant Examiner—Karen J. Chotkowski
Attorney, Agent, or Firm—James E. Nilles

[57] ABSTRACT

A shelving device wherein a side plate of a shelf is connected to a shelf plate through an insert attached to the side plate and an engagement member attached to the shelf plate. The insert has its portion buried and fixed in the side plate and is formed at one end of its buried portion with a generally trapezoidal receiving portion gradually narrowed upward and on both its sides with sloped faces. The engagement member has its engagement portion adapted to be buried and fixed in the lower face of one end portion of the shelf plate and is formed at one side of its engagement portion with an engagement recess gradually narrowed upward to fit the receiving portion therein and at both the sides of its engagement recess with a dovetail groove having sloped faces closely engaging the sloped faces on the two sides of the receiving portion.

3 Claims, 12 Drawing Figures

SHELVING DEVICE

BACKGROUND OF THE INVENTION

1. Field of the Invention

The present invention relates to a device for attaching a shelf to an upright member.

2. Description of the Prior Art

In the prior art, there have been used a variety of devices for attaching shelves to upright members, which devices are generally grouped into those designed for detachably supporting a shelf and others for fixing the shelf.

However, the former devices have failed to stably support the shelf, and the latter have made it difficult to adjust the levels of the shelf.

SUMMARY OF THE INVENTION

The present invention is designed to improve the above-specified difficulties and has an object of providing a device which can stably attach a shelf easily and reliably and to facilitate its attachment and detachment.

According to a feature of the present invention, there is provided a device comprising: an insert 1 to be attached to a side plate 22 of a shelf rack 21; and an engagement member 11 attached to a shelf 23 and adapted to come into engagement with said insert 1, wherein the improvement is characterized: in that said insert 1 has its portion 2 buried and fixed in said side plate 22 and is formed at one end of its buried portion 2 with a generally trapezoidal receiving portion 6 gradually narrowed upward and on both its sides with sloped faces 7; and in that said engagement member 11 has its engagement portion 12 adapted to be fixed on and buried in the lower face of one end portion of said shelf 23 and is formed at one side of its engagement portion 12 with an engagement recess 16 gradually narrowed upward to fit said receiving portion 6 therein and at both the sides of its engagement recess 16 with a dovetail groove 18 having sloped faces 17 mating with the sloped faces 7 on the two sides of said receiving portion 6.

In the device according to the present invention, the insert 1 is fixed through its buried portion 2 in the side plate 22 of the shelf rack 21, and the engagement member 11 is fixed in the lower face of the end portion of the shelf 23 such that the engagement recess 16 of the engagement member 11 is fitted so that it tapers into the receiving portion 6 of the insert 1 in such a manner that the sloped faces 7 at the two sides of the receiving portion 6 and the sloped faces 17 at the two sides of the engagement recess 16 are fitted into the dovetail groove 18 while closely engaging each other.

BRIEF DESCRIPTION OF THE INVENTION

Other objects and features of the present invention will be described with reference to the accompanying drawings, in which.

DESCRIPTION OF THE PREFERRED EMBODIMENT

Figure 1:
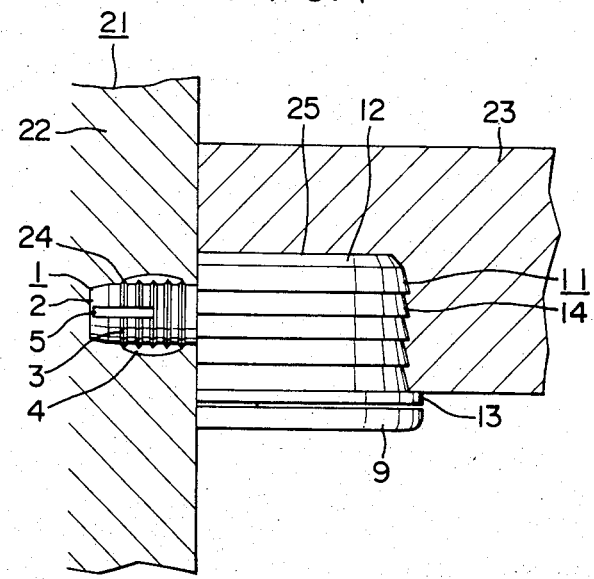
FIG. 1 is a side elevation showing one embodiment of the device according to the present invention.
Figure 2:
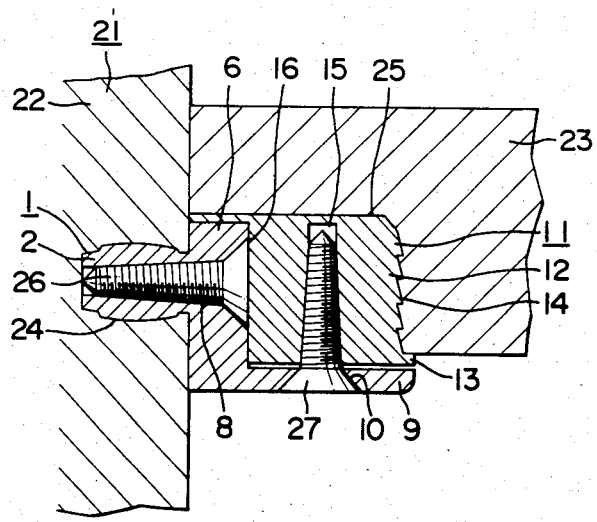
FIG. 2 is a section showing the same.
Figure 3A:
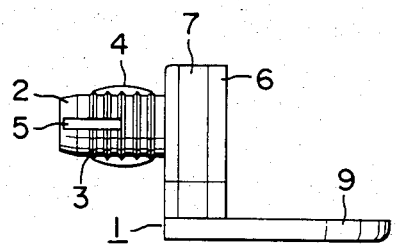
FIGS. 3A and 3B are side elevations showing an insert and an engagement member, respectively.
Figure 3B:
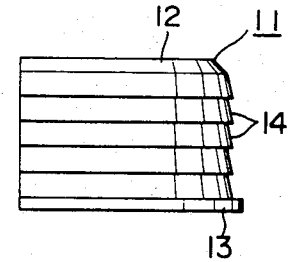
Figure 4A:
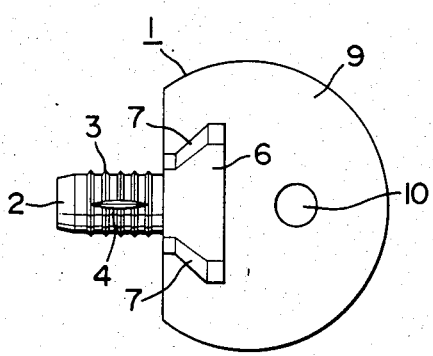
FIGS. 4A and 4B are top plan views showing the same.
Figure 4B:
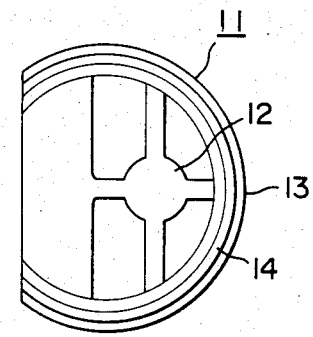
Figure 5A:
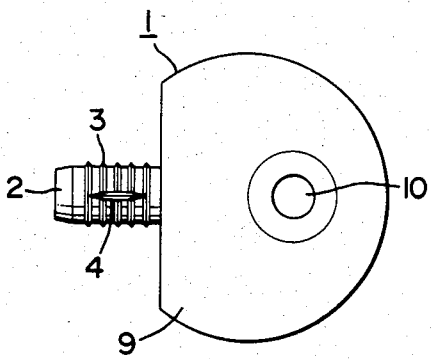
FIGS. 5A and 5B are bottom views showing the same.
Figure 5B:
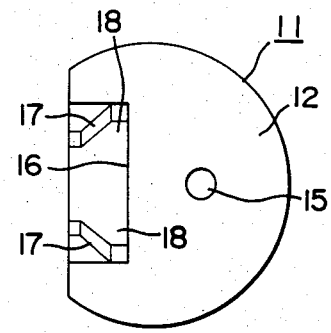
Figure 6A:
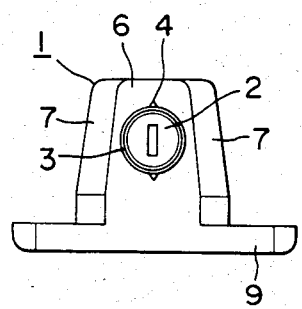
FIGS. 6A and 6B are front elevations showing the same.
Figure 6B:
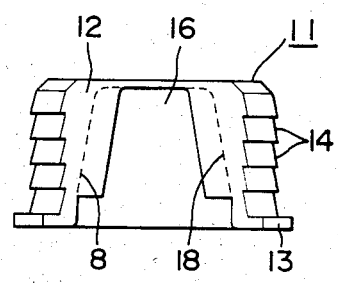
Figure 7:
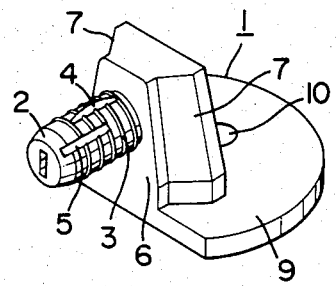
FIG. 7 is a perspective view showing the insert.
Figure 8:
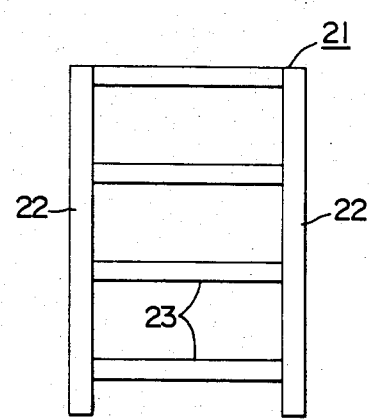
FIG. 8 is a front elevation of a shelf rack.

Indicated at reference numeral 1 is an insert which is integrally made of a synthetic resin. This insert 1 has a cylindrical buried portion 2 which is formed on its outer circumference with a plurality of annular ridges 3 and longitudinal ridges 4 and which is formed with a plurality of longitudinal slits 5. Moreover, the buried portion 2 is formed at its end portion with a generally trapezoidal receiving portion 6, which is gradually narrowed upward, and on both the outer sides thereof with sloped faces 7. The receiving portion 6 is also formed with a through bore 8 which merges into the inside of the buried portion 2. Moreover, the receiving portion 6 is equipped at its lower end with a generally circular support plate 9 which has its one side cut away and which is formed with a fixing hole 10 at its substantially central portion.

Indicated at numeral 11 is an engagement member which is integrally made of a synthetic resin. This engagement member 11 has a generally column-shaped engagement portion 12 which has its one side cut away and which is formed with a flange 13 around the outer circumference of its lower end. Moreover, the engagement portion 12 is formed on its outer circumference with saw-toothed engagement ridges 14, and the engagement member 11 is drilled to form a fixing hole 15 which extends from its lower face to its substantially central portion such that it is aligned with the aforementioned fixing hole 10. The engagement portion 12 is formed at a flattened portion on one side with a generally trapezoidal engagement recess 16 which is opened at its lower end and at its outer side and is gradually narrowed upward so that the aforementioned receiving portion 6 fits therein. Inside of the two sides of that engagement recess 16, there is formed a dovetail groove 18 which has sloped faces 17 to mate with the sloped faces 7 at the two sides of the aforementioned receiving portion 6.

Indicated at numeral 21 is a wooden shelf rack which is equipped with a plurality of shelves 23 between its two side plates 22.

Thus, the buried portion 2 of the insert 1 is driven into a mounting hole 24, which is formed in a predetermined position in the side plate 22 at one of the two sides of the shelf rack 21, until it is buried and fixed therein. This fixing is effected by causing the plural engagement ridges 3 and 4 of the buried portion 2 to bite into the inner face of the mounting hole 24. Moreover, a tapping screw 26 is driven from the through bore 8 of the receiving portion 6 into the buried portion 2 so that this buried portion 2 is expanded through the slits 5 to promote the bite of the engagement ridges 3 and 4 thereby to ensure the fixing. In this instance, the buried portion 2 may be fixed by an adhesive.

Then, the engagement portion 12 of the engagement member 11 is driven into a mounting recess 25, which is formed in the lower face of the corresponding one end of the shelf 23, until it is buried and fixed therein by causing the plural engagement ridges 14 to bite into the inner face of the mounting recess 25. In this case, too, the engagement portion 12 may be fixed by means of an adhesive.

Then, the engagement recess 16 of the engagement member 11 at each end of that shelf 23 is taperingly fitted onto the receiving portion 6 at the side plate 22 at the corresponding side, and the two sides of the receiving portion 6 are fitted in the dovetail groove 18 such that the sloped faces 17 at the two sides of the engagement recess 16 closely engage the sloped faces 7 at the two sides of the receiving portion 6.

As a result, the engagement recess 16 and the receiving portion 6 are tightly fixed laterally and longitudinally through both the taper fixture gradually narrowed upward and the dovetail engagement.

A tapping screw 27 is driven from the fixing hole 10 of the support plate 9 of the insert 1 into the fixing hole 15 of the engagement member 11 to fix the shelf 23 vertically.

The insert 1 and the engagement member 11 can be withdrawn from each other although the engagement between the sloped faces 7 and 17 of the dovetail groove 18 reliably supports the shelf 23 and prevents the side plate 22 from warping outward.

In the present invention, the engagement recess of the engagement member attached to the shelf is fitted on the receiving portion of the insert attached to a side plate of a shelf rack so that it can taper into the dovetail groove to attach the shelf removably and stably.

What is claimed is:

1. A device for so securing a shelf to an upright member as to dispose an end of the shelf closely adjacent to a side of the upright member, of the type comprising an insert element for attachment to the upright member and an engagement element for attachment to the shelf and for connection with the insert element, said device being characterized by:
   A. said insert element having
      (1) a horizontally elongated buried portion which has inner and outer ends and which is receivable in a hole in the upright member that opens to said side thereof, and
      (2) a receiving portion on the outer end of said buried portion, having
         (a) a flat vertical surface which is transverse to the length of said buried portion and which faces towards said inner end thereof to flatwise engage said side of the upright member,
         (b) a support plate portion that projects from said flat surface in the direction away from said inner end and which has a horizontal top surface, and
         (c) a pair of opposite oblique side surfaces
            (i) which extend at such opposite upward inclinations in relation to said horizontal surface as to be in upwardly convergent relation to one another and
            (ii) which are at such opposite inclinations to said flat surface as to diverge from one another in said direction;
   B. said engagement element being closely receivable in a cavity in the shelf that opens to its bottom and to its said end and having
      (1) a flat side surface which is flush with said end of the shelf when the engagement element is received in said cavity,
      (2) a bottom surface opposable to said horizontal top surface of the support plate portion of the insert element,
      (3) a pocket which opens to said bottom surface and to said flat side surface and which has a pair of opposing oblique inner surfaces that matingly engage said oblique side surfaces on the receiving portion of the insert element and cooperate with them as the engagement element is slid down relative to the insert element to wedgingly drive said flat side surface of the engagement element firmly against said side of the upright member, and
      (4) a hole opening to said bottom surface which aligns with a hole through said support plate portion of the insert element and in which a screw is receivable to draw the engagement element downward relative to the insert element and releasably secure those elements to one another.

2. The device of claim 1, further characterized in that said buried portion of the insert element has on its outer surface a plurality of circumferential ridges and longitudinal ridges.

3. The device of claim 1 wherein said insert element has longitudinal slits in its buried portion and has a hole that extends coaxially through its buried portion and its receiving portion for receiving a tapping screw whereby said buried portion is radially expanded after it is received in said hole in the upright member.

* * * * *